United States Patent
Matthes et al.

(10) Patent No.: US 12,464,067 B2
(45) Date of Patent: Nov. 4, 2025

(54) EXPERIENTIAL MOMENT LOCKING AND UNLOCKING SYSTEM AND METHOD

(71) Applicant: Tikel Corp., St. Petersburg, FL (US)

(72) Inventors: Kelly Matthes, St. Petersburg, FL (US); Uri Avissar, Demarest, NJ (US); Federico Frappi, Florence (IT); Matteo Innocenti, Signa (IT)

(73) Assignee: TIKEL CORP., St. Petersburg, FL (US)

( * ) Notice: Subject to any disclaimer, the term of this patent is extended or adjusted under 35 U.S.C. 154(b) by 434 days.

(21) Appl. No.: 17/980,973

(22) Filed: Nov. 4, 2022

(65) Prior Publication Data

US 2024/0155049 A1    May 9, 2024

(51) Int. Cl.
G06V 40/16    (2022.01)
H04M 1/7243   (2021.01)

(52) U.S. Cl.
CPC .......... H04M 1/7243 (2021.01); G06V 40/16 (2022.01)

(58) Field of Classification Search
None
See application file for complete search history.

(56) References Cited

U.S. PATENT DOCUMENTS

| | | | |
|---|---|---|---|
| 11,115,422 B2 | 9/2021 | Butler et al. | |
| 2015/0319169 A1* | 11/2015 | Cronin | H04L 63/0861 726/7 |
| 2019/0220609 A1* | 7/2019 | Ghazanfari | G09G 5/377 |
| 2020/0036720 A1* | 1/2020 | Butler | H04L 63/102 |
| 2021/0258320 A1* | 8/2021 | Butler | H04L 63/102 |

FOREIGN PATENT DOCUMENTS

| | | |
|---|---|---|
| CN | 105205364 A | 12/2015 |
| CN | 103841003 B | 12/2017 |
| CN | 107770042 A | 3/2018 |
| CN | 108376096 A | 8/2018 |
| CN | 110889715 A | 3/2020 |
| CN | 111949116 A | 11/2020 |

* cited by examiner

Primary Examiner — Idowu O Osifade
(74) Attorney, Agent, or Firm — PEARL COHEN ZEDEK LATZER BARATZ LLP

(57) ABSTRACT

A method includes receiving, by at least one processor, a request to send a message to a recipient computing device, locking, by the at least one processor, the message to send to the recipient computing device using at least one factor of a number of factors, determining, by the at least one processor, a recipient associated with the recipient computing device and sending the message to the recipient computing device, determining, by one of the at least one processor and the recipient computing device, whether the message can be unlocked by the recipient computing device based on the number of factors, and unlocking, by one of the at least one processor and the recipient computing device, the message based on the number of factors.

20 Claims, 13 Drawing Sheets

EXPERIENTIAL MOMENT LOCKING AND UNLOCKING SYSTEM AND METHOD

BACKGROUND

People regularly use computing devices to communicate with others and send messages to one another. The growth of social media has allowed people to easily communicate with their family, friends, and wider audiences with ease. In the past, users typically used desktop computers and laptop computers to communicate with others. However, as cellular service grew and expanded to allow for more than phone calls, it became possible to do more with mobile phones and devices. The birth and subsequent growth of the smartphone allowed people to use their mobile phone for more than phone calls including connecting with others using social media. As social media and computing devices continue to evolve, they allow for users to connect with others in new and exciting ways.

It is with these issues in mind, among others, that various aspects of the disclosure were conceived.

SUMMARY

The present disclosure is directed to an experiential moment locking and unlocking system and method. A system may include a plurality of client computing devices and at least one server computing device. A user of a sender client computing device may create and send a message to at least one recipient client computing device. The sender of the message may lock at least a portion or subset of the message using at least one factor of a number of factors, protect at least a portion or subset of the message, or prevent a recipient from viewing or receiving at least the portion or subset of the message based on the number of factors.

In one example, a method may include receiving, by at least one processor, a request to send a message to a recipient computing device, locking, by the at least one processor, the message to send to the recipient computing device using at least one factor of a number of factors, determining, by the at least one processor, a recipient associated with the recipient computing device and sending the message to the recipient computing device, determining, by one of the at least one processor and the recipient computing device, whether the message can be unlocked by the recipient computing device based on the number of factors, and unlocking, by one of the at least one processor and the recipient computing device, the message based on the number of factors.

In another example, a system may include a memory storing computer-readable instructions and at least one processor to execute the instructions to receive a request to send a message to a recipient computing device, lock the message to send to the recipient computing device using at least one factor of a number of factors, determine a recipient associated with the recipient computing device and send the message to the recipient computing device, determine, by one of the at least one processor and the recipient computing device, whether the message can be unlocked by the recipient computing device based on the number of factors, and unlock, by one of the at least one processor and the recipient computing device, the message based on the number of factors.

In another example, a non-transitory computer-readable storage medium includes instructions stored thereon that, when executed by a computing device cause the computing device to perform operations, the operations including receiving a request to send a message to a recipient computing device, locking the message to send to the recipient computing device using at least one factor of a number of factors, determining a recipient associated with the recipient computing device and sending the message to the recipient computing device, determining, by one of the server computing device and the recipient computing device, whether the message can be unlocked by the recipient computing device based on the number of factors, and unlocking, by one of the server computing device and the recipient computing device, the message based on the number of factors.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
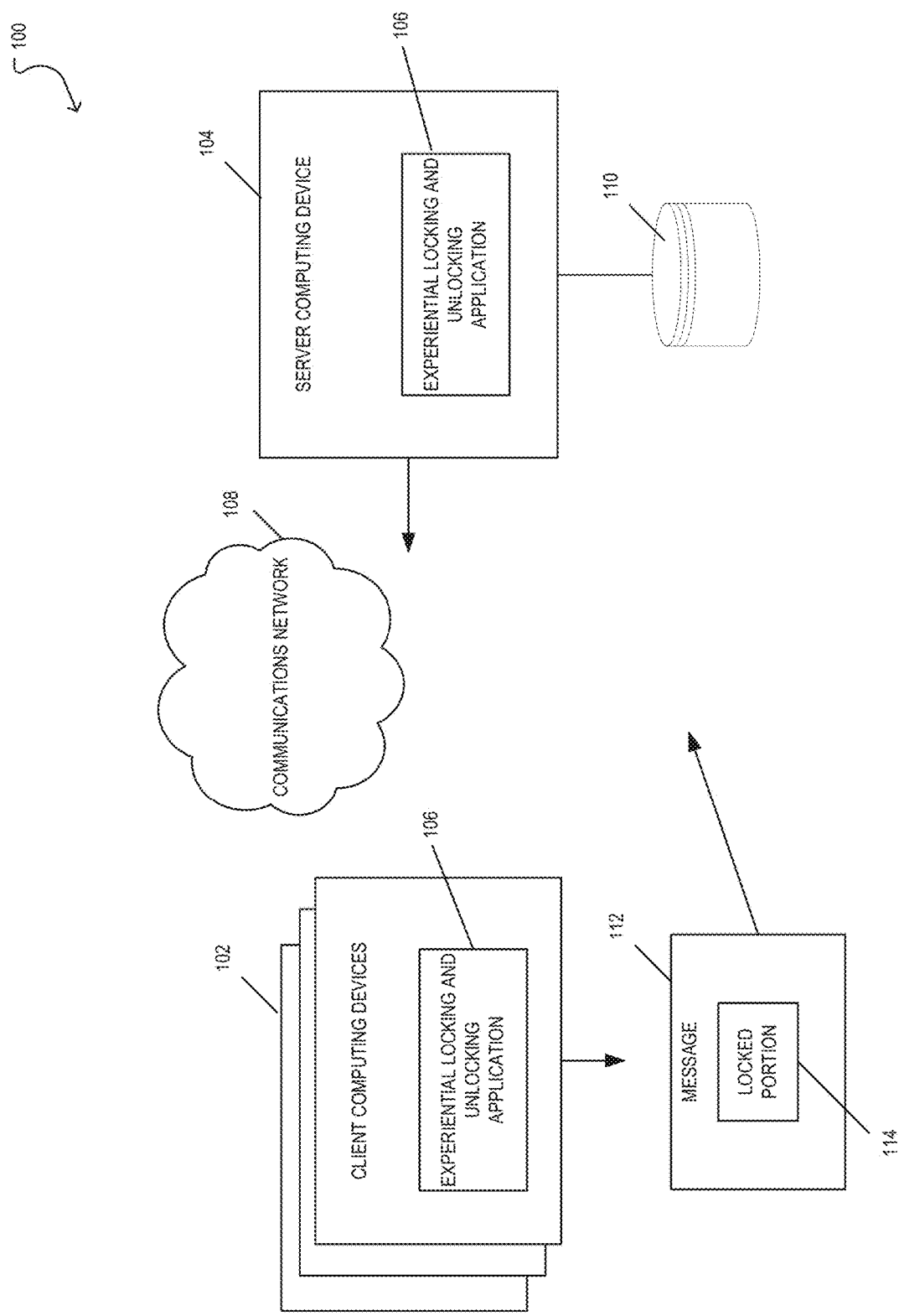
FIG. 1 is a block diagram of an experiential moment locking and unlocking system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of an experiential moment locking and unlocking system includes a sending or first client computing device that creates a message or a Tikel to send to at least one recipient client computing device. The sender of the message may lock, protect, or obscure at least a portion or subset of the message using one or more factors. The message may be unlocked by the recipient of the message based on the number of factors. As an example, a user of the sending client computing device may create a message that may include a background, text having one or more characters to be displayed, one or more audio recordings, one or more images or videos, and one or more GIFs. The text may be one or more different colors. In one example, a user may draw an image or doodle using their finger and the touchscreen of the sending client computing device. The user of the sending client computing device may lock the message and prevent the recipient from viewing the message until the user of the recipient client computing device completes one or more factors to unlock the message. As an example, the user of the sending client computing device may lock the message using one or more factors such as a "Smile Lock", a lock based on a location of the recipient client computing device, and a time-based lock and the user of the recipient client computing device can only unlock the message by meeting the one or more factors. As another example, the user of the sending client computing device may lock the message using a doodle lock. A user of the recipient client computing device may only unlock the message by providing a particular doodle.

As an example, if the user of the sending client computing device uses a Smile Lock to lock the message, the user of the recipient client computing device is to smile and the recipient client computing device may determine whether the user provides a smile to one or more imaging devices or cameras of the recipient client computing device. If the user smiles, the recipient client computing device may unlock the message for viewing by the recipient client computing device. In this case, the recipient client computing device may send a request to the server computing device for the locked message and receive the locked message and/or content associated with the locked message from the server computing device. In other examples, the user of the sending client computing device can use a different facial expression lock to allow a user to unlock the message such as a frown, among other facial expressions. If a smile lock is used, the recipient client computing device and/or the server computing device may determine whether at least one image captured by the one or more imaging devices or cameras of the recipient client computing device is similar to a library of known images of users that are smiling. In one example, this may include use of image processing and comparison by the recipient client computing device and/or the server computing device. The image processing and comparison may utilize machine learning aspects and the images captured by the recipient client computing device may be added to the library of known images of users that are smiling.

As another example, if the user of the sending client computing device uses a lock based on a location of the recipient client computing device to lock the message, the user of the recipient client computing device may have to be physically located within a particular distance of the location. The recipient client computing device may determine whether the recipient client computing device is within the particular distance using geopositioning or geotracking by utilizing at least one of a GPS device of the recipient client computing device, Wi-Fi, cellular, Bluetooth, and others. If the recipient client computing device is within the particular distance, the recipient client computing device may unlock the message for viewing by the recipient client computing device.

As another example, if the user of the sending client computing device applies a time-based lock, the user of the recipient client computing device may not be able to unlock the message until a particular time has been reached or only before a particular time is reached. If the particular time has been reached or before the particular time is reached, the recipient client computing device may unlock the message for viewing by the recipient client computing device.

As another example, if the user of the sending client computing device applies a doodle lock, the user of the recipient client computing device may not be able to unlock the message until a doodle is provided to the recipient client computing device. If the doodle such as a particular doodle is provided, the recipient client computing device may unlock the message for viewing by the recipient client computing device.

In one example, the system may allow a user of a client computing device to receive messages from others or send messages to others. As an example, at least a portion or a subset of the message may be locked, secured, or obscured. The message can be locked by the user of the sending client computing device and unlocked by the recipient based on one or more factors including a current time, by providing a particular facial expression to at least one camera of the client computing device, by providing at least one gesture to a touchscreen of the client computing device, a current location of the client computing device, by completing a challenge as created by the sender to be completed by the recipient, data or information as provided by a separate device such as a wearable fitness tracking device that indicates that a goal has been reached by the recipient, data or information as provided by a separate device such as an internet of things (IOT) device that indicates that a goal has been reached, e.g., reduced vehicle fuel consumption indicated by a vehicle IOT device, and one or more factors in combination. As an example, the message may include one or more components such as a redeemable monetary gift or token, at least one graphic, at least one image, at least one video, text, audio, at least one emoji, a voice recording, a drawing created using the touchscreen device of the client computing device, and others. As an example, the redeemable monetary gift or token may be either a gift card or funds that may be deposited into a particular account such as a PAYPAL account, a VENMO account, a credit card account, a retail account, or another type of account. Even further, the sender of the message may recommend a specific vendor where the gift may be redeemed. In one example, an employer may allow employees to send Tikels or messages to other employees as part of a wellness program, where each message may include a redeemable monetary gift or token for employees that achieve goals or milestones.

FIG. 1 is a block diagram of an experiential moment locking and unlocking system 100 according to an example of the instant disclosure. As shown in FIG. 1, the system 100 may include a plurality of client computing devices 102 as well as at least one server computing device 104. The plurality of client computing devices 102 and the server computing device 104 may have an experiential locking and unlocking application 106.

The client computing device 102 and the server computing device 104 may have the experiential locking and unlocking application 106 that may be a component of an application and/or service executable by the plurality of client computing devices 102 and/or the server computing device 104. For example, the experiential locking and unlocking application 106 may be a single unit of deployable executable code or a plurality of units of deployable executable code. According to one aspect, the experiential locking and unlocking application 106 may include one or more components that may be a web application, a native application, and/or a mobile application (e.g., an app) downloaded from a digital distribution application platform that allows users to browse and download applications developed with mobile software development kits (SDKs) including the App Store and GOOGLE PLAY™ among others.

The experiential moment locking and unlocking system 100 also may include a relational database management system (RDBMS) or another type of database management system such as a NoSQL database system that stores and communicates data from at least one database 110. The data stored in the at least one database may be associated with one or more users associated with the system and may include information and data associated with messages sent from one client computing device 102 to at least one other client computing device 102. Each user may have username/password information for use with the system. In addition, each user may have a unique identifier for the system 100 to identify each user and each unique identifier may be associated with one or more user identifiers such as a phone number, an email address, a username, and other identifiers. The unique identifier may be used to identify a particular recipient client computing device to receive a message from a sender client computing device. However, according to an example, the phone number or email address and other personal information are not stored in the database 110, but rather are associated with the unique identifier. Each message also may have a unique message identifier that may be used to identify each message and data and information associated with each message such as locking information associated with one or more factors.

The plurality of client computing devices 102 and the at least one server computing device 104 may be configured to receive data from and/or transmit data through a communication network 108. Although the server computing device 104 is shown as a single computing device, it is contemplated the server computing device 104 may include multiple computing devices. As an example, the server computing device 104 may include one or more cloud computing devices such as virtual cloud computing servers or cloud computing instances or virtual machines that together provide the server computing device 104.

The communication network 108 can be the Internet, an intranet, or another wired or wireless communication network. For example, the communication network 108 may include a Mobile Communications (GSM) network, a code division multiple access (CDMA) network, $3^{rd}$ Generation Partnership Project (GPP) network, an Internet Protocol (IP) network, a wireless application protocol (WAP) network, a Wi-Fi network, a Bluetooth network, a Bluetooth Low Energy (BLE) network, an Infrared Technology (IR) network, a Radio Frequency (RF) network, an IEEE 802.15.4 Communications protocol network (e.g., Zigbee), a RS-232 Serial communication standard network, a WiMax network, a satellite communications network, or an IEEE 802.11 standards network, as well as various communications networks thereof. Other conventional and/or later developed wired and wireless networks may also be used.

The client computing device 102 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 102 further includes at least one communications interface to transmit and receive communications, messages, and/or signals.

The client computing device 102 could be a programmable logic controller, a programmable controller, a laptop computer, a smartphone, a personal digital assistant, a tablet computer, a standard personal computer, or another processing device. The client computing device 102 may include a display, such as a computer monitor, for displaying data and/or graphical user interfaces. The client computing device 102 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 104 further includes at least one communications interface to transmit and receive communications, messages, and/or signals.

As an example, the client computing device 102 and the server computing device 104 communicate data in packets, messages, or other communications using a common protocol, e.g., Hypertext Transfer Protocol (HTTP) and/or Hypertext Transfer Protocol Secure (HTTPS). The one or more computing devices may communicate based on representational state transfer (REST) and/or Simple Object Access Protocol (SOAP). As an example, a first computer (e.g., the client computing device 102) may send a request message that is a REST and/or a SOAP request formatted using Javascript Object Notation (JSON) and/or Extensible Markup Language (XML). In response to the request message, a second computer (e.g., the server computing device 104) may transmit a REST and/or SOAP response formatted using JSON and/or XML.

As shown in FIG. 1, a user of a sender client computing device 102 may create a message 112 that includes a locked portion 114 and the user of the sender client computing device 102 may select at least one recipient to receive the message 112 with the locked portion 114. The sender client computing device 102 may send the message 112 to the server computing device 104 and the server computing device 104 may notify at least one recipient client computing device 102 that they have a message 112 to be viewed and unlocked 114. The user of the recipient client computing device 102 may unlock the locked portion 114. As an example, the locked portion 114 may be locked using a smile lock, a time-based lock, a doodle lock, or a location-based lock, among others.

Figure 2:
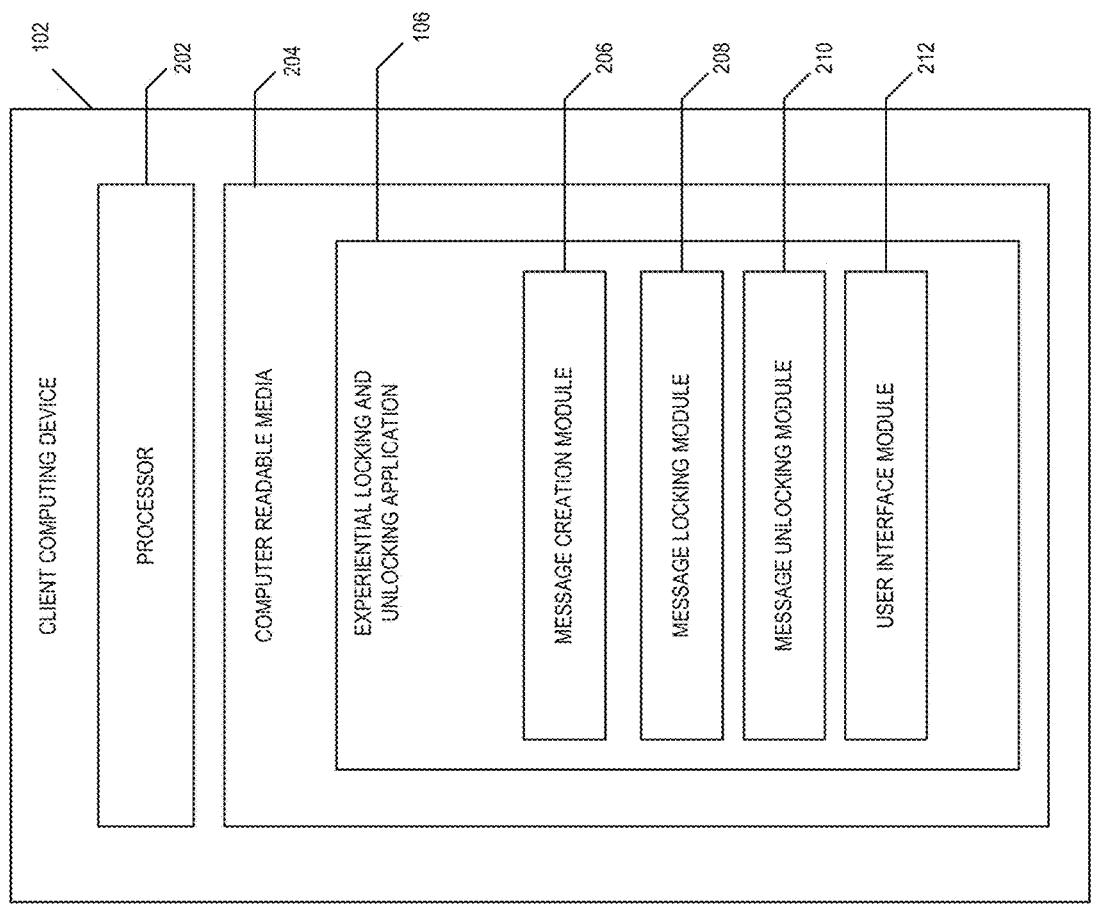
FIG. 2 is a block diagram of a client computing device of the experiential moment locking and unlocking system having an experiential locking and unlocking application according to an example of the instant disclosure.

FIG. 2 illustrates a block diagram of the client computing device 102 according to an example embodiment. The client computing device 102 includes computer readable media (CRM) 204 in memory on which the experiential locking and unlocking application 106 or other user interface or application is stored. The computer readable media 204 may include volatile media, nonvolatile media, removable media, non-removable media, and/or another available medium that can be accessed by the processor 202. By way of example and not limitation, the computer readable media 204 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The experiential locking and unlocking application 106 may include a message creation module 206 for creating a message 112 based on a request from a client computing device 102. In one example, at least a portion of the message creation module 206 may be executed by the server computing device 104. As an example, the user of a sending client computing device 102 may create a message 112 to be sent to one or more recipient client computing devices 102. As an example, a user of the sending client computing device 102 may create a message 112 that may include a background, text, one or more audio recordings, one or more images or videos, and one or more GIFs. The text may be one or more different colors. The user may select one or more users or recipients to receive the message 112. As an example, the user may provide a phone number, an email address, a username, or another identifier for each user or recipient to receive the message. The at least one recipient client computing device 102 to receive the message 112 may be determined by determining one or more unique identifiers selected to receive the message. Each user may have a unique identifier as determined by the server computing device 104 and stored in the database 108 that is associated with their phone number, their email address, and their username.

In one example, the server computing device 104 may determine that the recipient is not associated with the system 100. In that case, the server computing device 104 may send a notification such as a text message to the phone number or an email that provides information about the experiential locking and unlocking application 106. The information may include at least one URL that may allow the user to download the experiential locking and unlocking application 106 to view the message having the locked portion 114.

The experiential locking and unlocking application 106 may include a message locking module 208 for locking at least a portion or subset of the message 114 based on the request from the client computing device 102. The user of the sending client computing device may lock the message and prevent the recipient from viewing the message until the user of the recipient client computing device completes one or more factors to unlock the message 112.

The message 112 can be locked by the user of the sending client computing device 102 and unlocked by the recipient based on one or more factors including a current time, by providing a particular facial expression to at least one camera of the client computing device 102, by providing at least one gesture or doodle to a touchscreen of the client computing device 102, a current location of the client computing device 102, by completing a challenge as created by the sender to be completed by the recipient, data or information as provided by a separate device such as a wearable fitness tracking device or watch that indicates that a goal has been reached by the recipient, data or information as provided by a separate device such as an internet of things (IOT) device that indicates that a goal has been reached, e.g., reduced vehicle fuel consumption indicated by a vehicle IOT device, and one or more factors in combination. As an example, the message 112 may include one or more components such as a redeemable monetary gift or token, at least one graphic, at least one image, at least one video, text, audio, at least one emoji, a voice recording, a drawing created using the touchscreen device of the client computing device, and others. As an example, the redeemable monetary gift or token such as a promo code or gift card code that could be a gift card or funds that may be deposited into a particular account such as a PAYPAL account or balance, a credit card account, a retail account or balance, or another type of account. Even further, the sender of the message may recommend a specific vendor to redeem the gift.

The experiential locking and unlocking application 106 may include a message unlocking module 210 for unlocking the portion or subset of the message 114. The user of the recipient client computing device 102 may unlock the message based on the one or more factors.

As an example, the user of the sending client computing device may lock the message 112 using one or more factors such as a "Smile Lock", a lock based on a location of the recipient client computing device, and a time-based lock and the user of the recipient can only unlock the message by meeting the one or more factors.

As an example, if the user of the sending client computing device uses a Smile Lock to lock the message 112, the user of the recipient client computing device is to smile and the recipient client computing device 102 may determine whether the user provides a smile to one or more imaging devices or cameras of the recipient client computing device. If the user smiles, the recipient client computing device 102 may unlock the message for viewing by the recipient client computing device. In some cases, the recipient client computing device 102 may send a request to unlock the message to the server computing device 104 and the server computing device 104 may unlock the message based on the request to unlock the message. In other cases, the recipient client computing device may unlock the message without sending a request to the server computing device 104.

As another example, if the user of the sending client computing device 102 uses a lock based on a location of the recipient client computing device 102 to lock the message 112, the user of the recipient client computing device 102 may have to be physically located within a particular distance of the location. The recipient client computing device 102 may determine whether the recipient client computing device is within the particular distance. If the recipient client computing device 102 is within the particular distance, the recipient client computing device 102 may unlock the message for viewing by the recipient client computing device.

As another example, if the user of the sending client computing device 102 uses a time-based lock, the user of the recipient client computing device may not be able to unlock the message 112 until a particular time has been reached or only may be able to unlock the message before the particular time has been reached. If the particular time has been reached or the particular time has not been reached, the recipient client computing device 102 may unlock the message for viewing by the recipient client computing device.

As another example, if the user of the sending client computing device 102 uses a doodle lock, the user of the recipient client computing device may not be able to unlock the message 112 until the recipient provides a doodle that may be provided to the touchscreen of the recipient client computing device. If the doodle, such as a particular doodle, is provided to the touchscreen, the recipient client computing device 102 may unlock the message for viewing by the recipient client computing device.

In addition, the experiential locking and unlocking application 106 includes a user interface module 212 for displaying a user interface on the display of the client computing device 102. As an example, the user interface module 212 generates a native and/or web-based graphical user interface (GUI) that accepts input and provides output viewed by users of the client computing device 102 or another computing device. The client computing device 102 or another computing device may provide realtime automatically and dynamically refreshed information. The user interface module 212 may send data to other modules of the experiential locking and unlocking application 106 of the client computing device 102 and retrieve data from other modules of the experiential locking and unlocking application 106 of the client computing device 102 asynchronously without interfering with the display and behavior of the user interface displayed by the client computing device 102 or another computing device.

Figure 3:
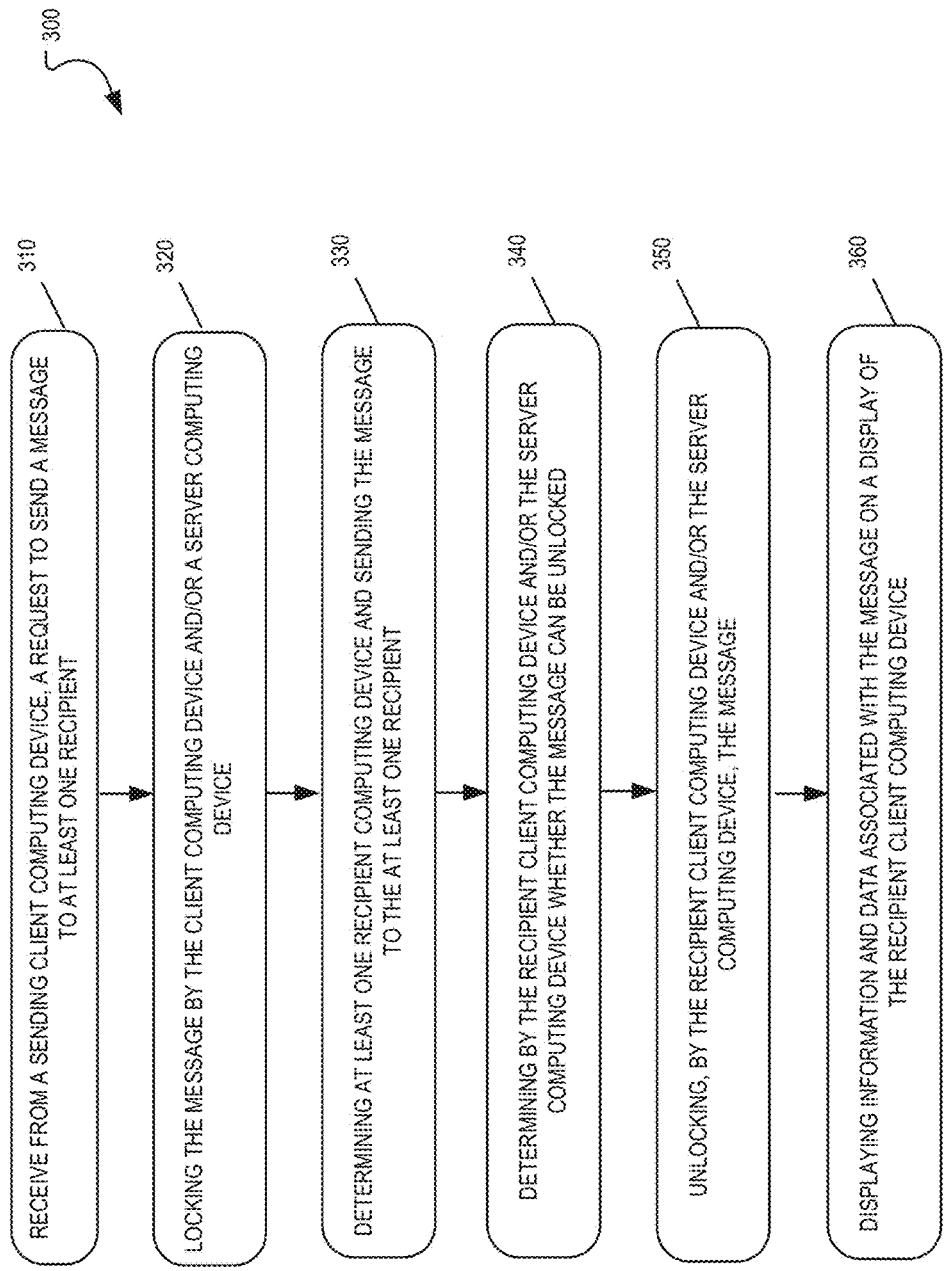
FIG. 3 is a flowchart of a method of sending a message from a sender client computing device to a recipient client computing device, the message having at least a portion that is locked or inaccessible according to an example of the instant disclosure.

FIG. 3 illustrates an example method 300 of sending a message from sender client computing device 102 to a recipient client computing device 102, the message 112 having at least a portion that is locked or inaccessible 114, according to an example of the instant disclosure. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 may include receiving from a sending or first client computing device 102, a request to send a message or Tikel 114 to at least one recipient client computing device 102 at block 310. In one example, the message 112 may include at least one of text including a plurality of characters, at least one image, at least one video, at least one graphics interchange format (GIF), and at least one emoji. The text may include one or more uniform resource locators (URLs).

Next, according to some examples, the method 300 may include locking at least a portion or a subset of the message or Tikel 114 by the sending client computing device 102 and/or the server computing device 104 at block 320. The message 112 may be locked based on one or more factors such as Smile Lock, a time based lock, or a location based lock, among others. As an example, the factors may include at least one of a current time, a facial expression provided by a recipient and detected in realtime by an imaging device of the recipient client computing device 102, a gesture provided by the recipient to a touchscreen of the recipient client computing device 102, a current location of the recipient computing device 102, a number of steps in a period of time determined by a fitness tracker in communication with the recipient client computing device 102, and data from an internet of things (IOT) computing device sent to the recipient client computing device 102. The at least the portion of the message is locked 114 by the client computing device 102 and/or the server computing device 104 and the portion of the message 114 can be unlocked based on the number of factors.

Next, according to some examples, the method 300 may include determining at least one recipient client computing device 102 and sending the message or Tikel 112 to the at least one recipient client computing device 102 at block 330. The at least one recipient client computing device 102 may be determined by determining one or more unique identifiers selected to receive the message.

Next, according to some examples, the method 300 may include determining by the client computing device 102 and/or the server computing device 104 whether the at least the portion or the subset of the message or Tikel 114 can be unlocked at block 340. As an example, the recipient client computing device 102 may unlock the message based on the one or more factors or may send a request to the server computing device 104 to unlock the message. As an example, the factors may include at least one of a current time, a facial expression provided by a recipient and detected in realtime by an imaging device of the recipient client computing device 102, a gesture provided by the recipient to a touchscreen of the recipient client computing device 102, a doodle provided by the recipient to a touchscreen of the recipient computing device 102, a current location of the recipient client computing device 102, a number of steps in a period of time determined by a fitness tracker in communication with the recipient client computing device 102, and data from an internet of things (IOT) computing device sent to the recipient client computing device 102.

Next, according to some examples, the method 300 may include unlocking by the recipient client computing device 102 and/or the server computing device 104, the at least the portion or the subset of the message 114 at block 350. As an example, the message 112 may include a monetary gift redeemable by the recipient when the message is unlocked based on the factors.

Next, according to some examples, the method 300 may include displaying information and data associated with the message or Tikel 112 on a display of the recipient client computing device 102 at block 360. This may include displaying the information and data associated with the unlocked portion or subset of the message 114 such as a secret message or information associated with redeeming the monetary gift such as a specific code such as quick response (QR) code or a promo code.

In some examples, the method 300 may include comparing a current time to a particular time to determine whether to unlock the message 112. If the current time is before the particular time or after the particular time, the message 112 may be unlocked.

In some examples, the method 300 may include comparing the facial expression provided by the recipient and determining whether the facial expression comprises a smile to determine whether to unlock the message 112. Alternatively, the facial expression may be something other than a smile such as a frown.

In some examples, the method 300 may include comparing the gesture provided to the touchscreen with a particular gesture to determine whether to unlock the message 112. As an example, the gesture may be an S that corresponds with an initial of a name of the recipient or the name of the sender. Other gestures are possible. The sender may define a particular gesture by indicating the type of gesture that is to be provided by the recipient.

In some examples, the method 300 may include comparing the current location with a particular location to determine whether to unlock the message 112. As an example, the current location of the recipient client computing device 102 may be determined using at least one of cellular, Wi-Fi, and GPS to determine whether the recipient client computing device 102 is within a particular distance from the particular location. In one example, the message may only be unlocked when the recipient client computing device 102 is located in a particular park or located at a particular restaurant, among other locations.

In some examples, the method 300 may include comparing the number of steps in the period of time with a threshold number of steps in the period of time to determine whether to unlock the message. As an example, the number of steps may be greater than a threshold number of steps in the period of time, e.g., 10,000 steps in twenty-four hours.

In some examples, the data from the IOT computing device could represent fuel consumption of a vehicle. The method 300 may include comparing the fuel consumption of the vehicle with a threshold fuel consumption to determine whether to unlock the message.

In some examples, the factors may further include a challenge to be completed by a user of the recipient computing device 102. The method 300 may include receiving a video representing a response to the challenge from the user of the recipient client computing device 102, transmitting the video the sending client computing device 102 for review by the user of the sending client computing device. The method 300 may further include receiving an approval of the challenge by the sending client computing device 102 and unlocking the message 112. In one example, the server computing device 104 may send a notification or a message to the sending client computing device 102 and request that the sender view the video and approve completion of the challenge by providing input to the touchscreen of the sender client computing device 102.

FIGS. 4-12 show screenshots of a graphical user interface (GUI) of the experiential locking and unlocking application 106 according to an example of the instant disclosure.

Figure 4:
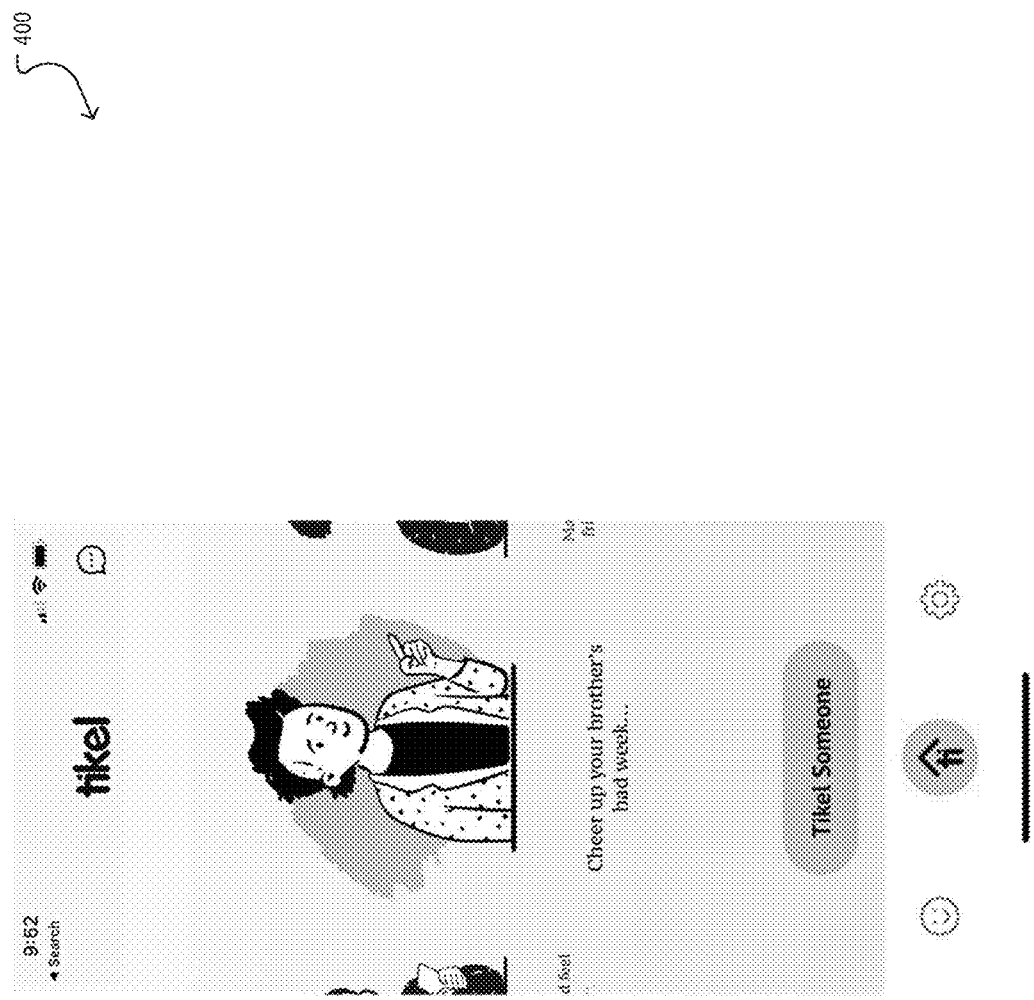
FIGS. 4-12 show screenshots of a graphical user interface (GUI) of the experiential locking and unlocking application according to an example of the instant disclosure.

FIG. 4 shows a screenshot 400 of an example GUI of the experiential locking and unlocking application 106 according to an example of the instant disclosure. As shown in FIG. 4, the GUI may include a number of selectable graphical user interface (GUI) elements that can be selected by a user of the client computing device 102. As an example, the user may select an element such as a "Tikel Someone" button that allows a user to create a message 112 to be sent to a recipient. In one example, the user can create a Tikel or a message to "Cheer up your brother's bad week."

Figure 5:
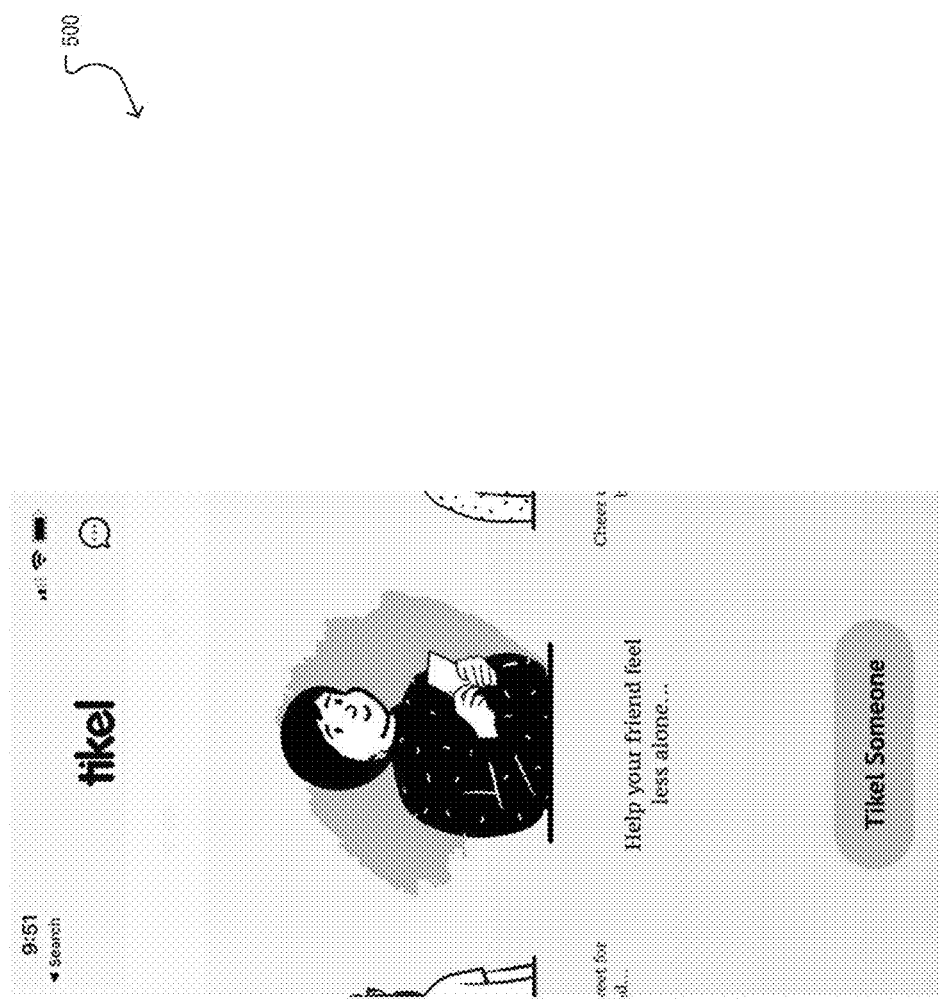

FIG. 5 shows a screenshot 500 of an example GUI of the experiential locking and unlocking application 106 according to an example of the instant disclosure. As shown in FIG. 5, the user may select a GUI element such as a "Tikel Someone" button that allows a user to create a message 112 to be sent to a recipient. In one example, the user can create a Tikel or a message to "Help your friend feel less alone."

Figure 6:
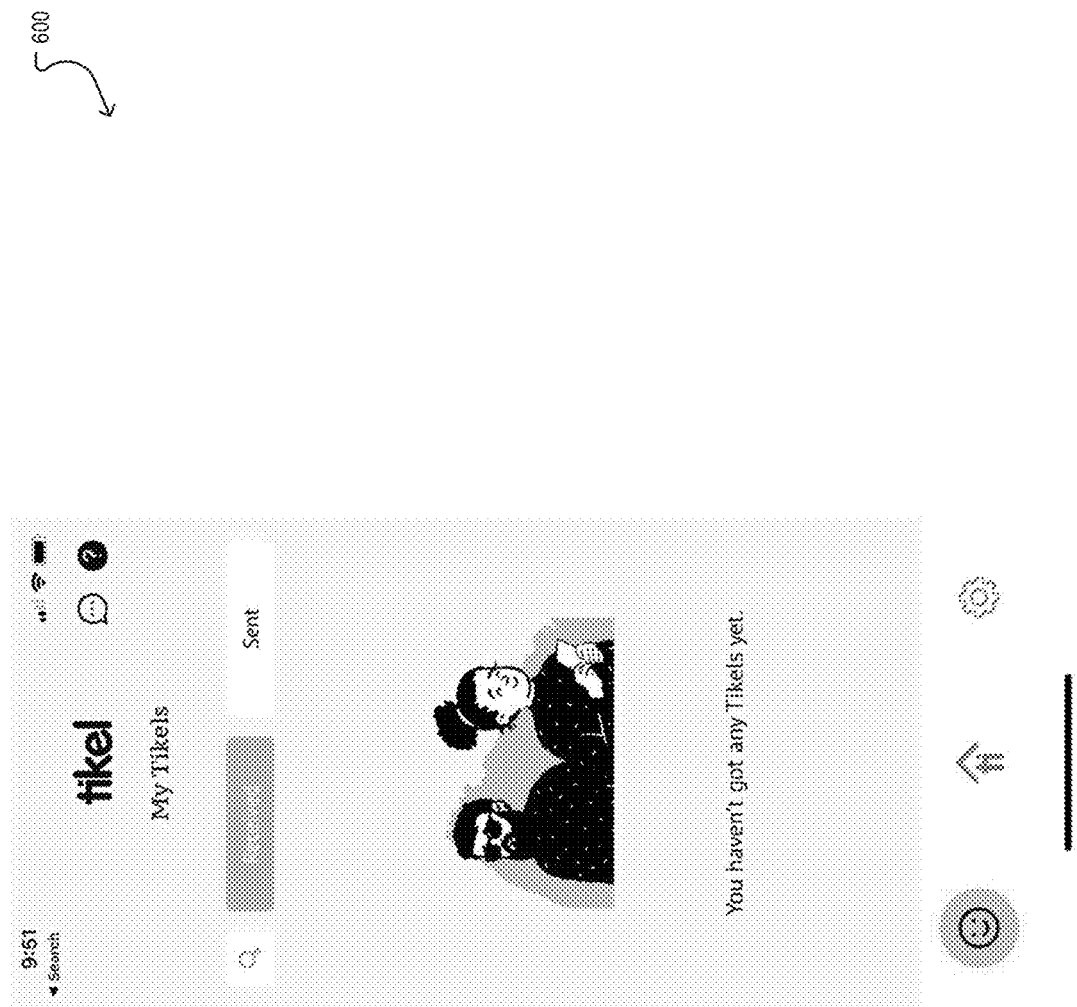

FIG. 6 shows a screenshot 600 of an example GUI of the experiential locking and unlocking application 106 according to an example of the instant disclosure. As shown in FIG. 6, a user can view messages or Tikels 112 that have been received and sent. A user may select a first GUI element to view the messages 112 that have been received and a second GUI element to view the messages 112 that have been sent.

Figure 7:
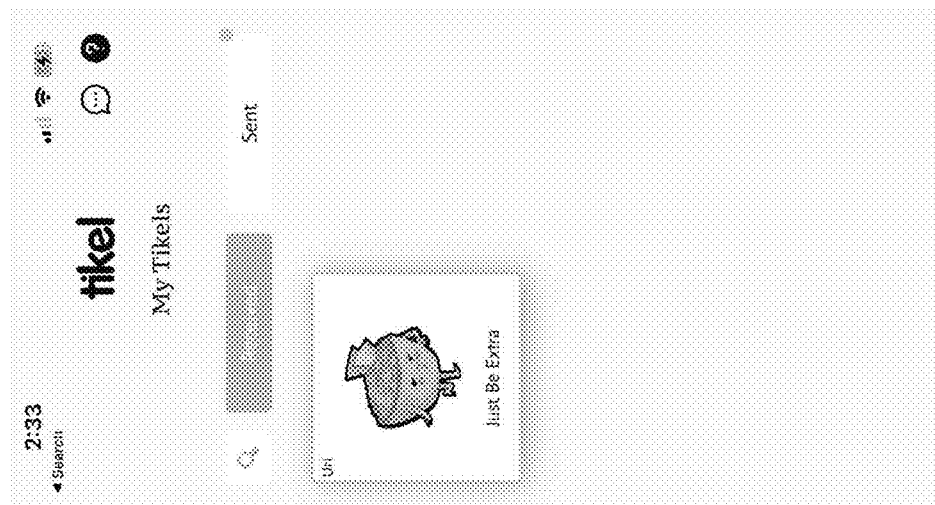
Figure 7:
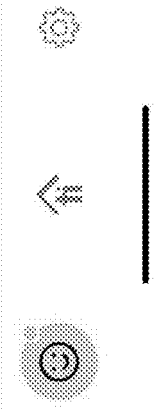

FIG. 7 shows a screenshot 700 of an example GUI of the experiential locking and unlocking application 106 according to an example of the instant disclosure. As shown in FIG. 7, there is a GUI element that represents a message 112 that has been received. A user can select the GUI element to view the message. In one example, this message has a title of "Just Be Extra."

Figure 8:
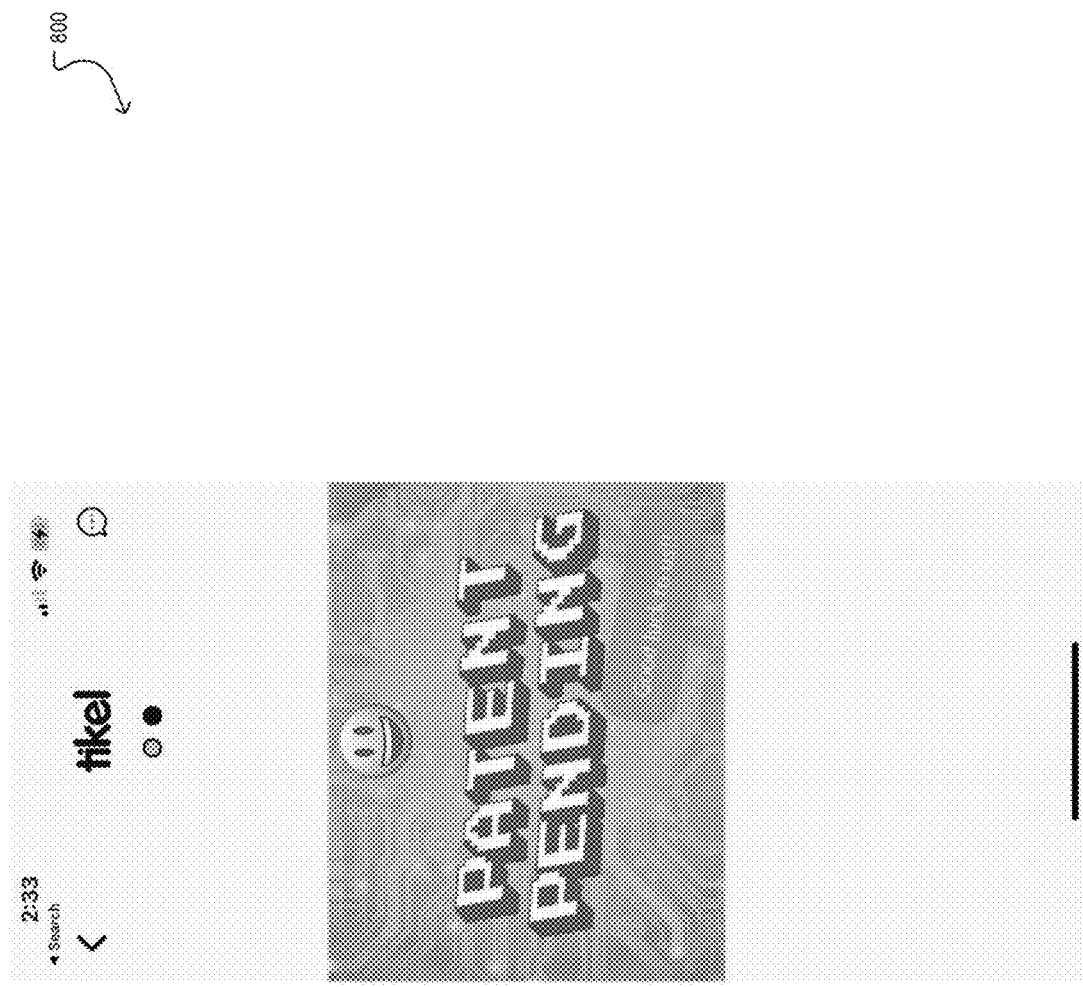

FIG. 8 shows a screenshot 800 of an example GUI of the experiential locking and unlocking application 106 according to an example of the instant disclosure. As shown in FIG. 8, an example message 112 that has been received is displayed. The message 112 may include one or more images or videos, one or more instances of text, and one or more emojis, among other components.

Figure 9:
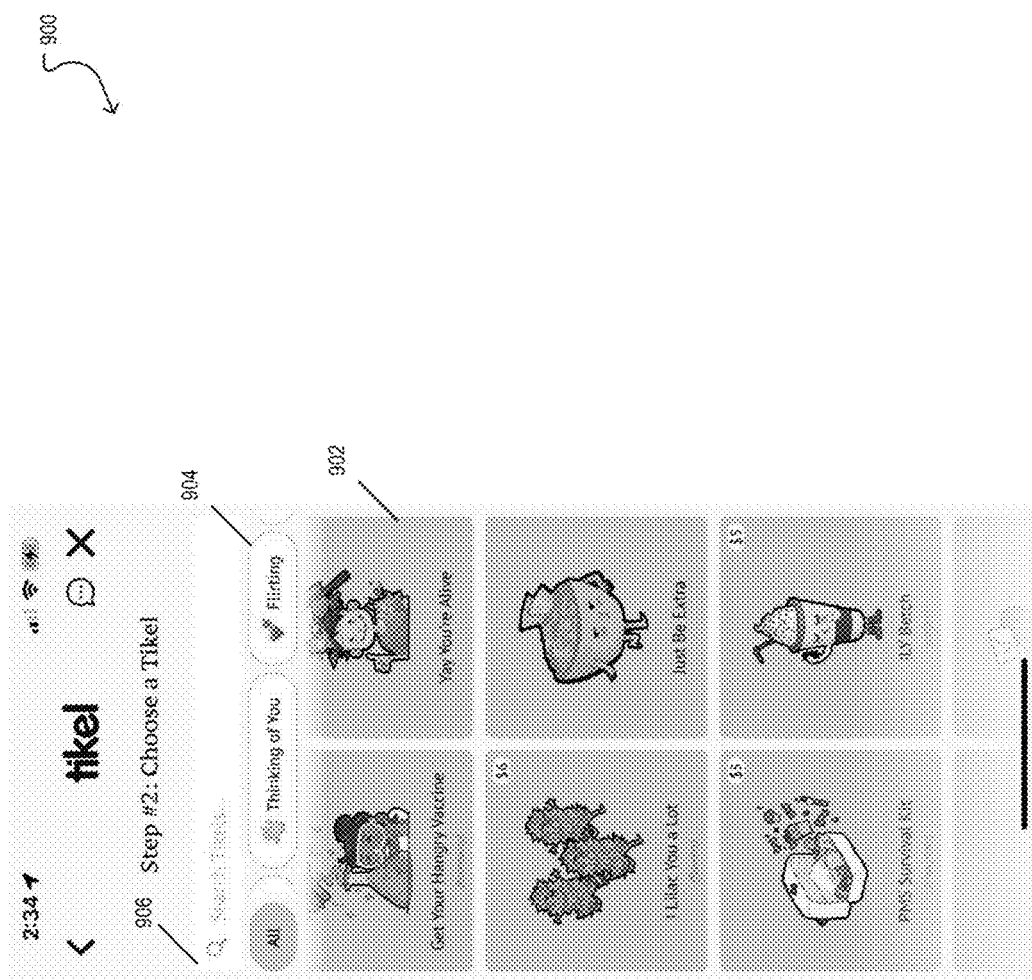

FIG. 9 shows a screenshot 900 of an example GUI of the experiential locking and unlocking application 106 according to an example of the instant disclosure. As shown in FIG. 9, a user may select from a number of message templates 902 such as the ones shown including "Get Your Hangry Vaccine," "Yay You're Alive," "I Lilac You a Lot," "Just Be Extra," "PMS Survival Kit," and "ILY Betch," among others. In addition the user may select from category GUI elements 904 such as "All," "Thinking of You," and "Flirting," to view message templates associated with a particular category. Additionally, a user may search the message templates by providing a text-based search into a search GUI element 906.

Figure 10:
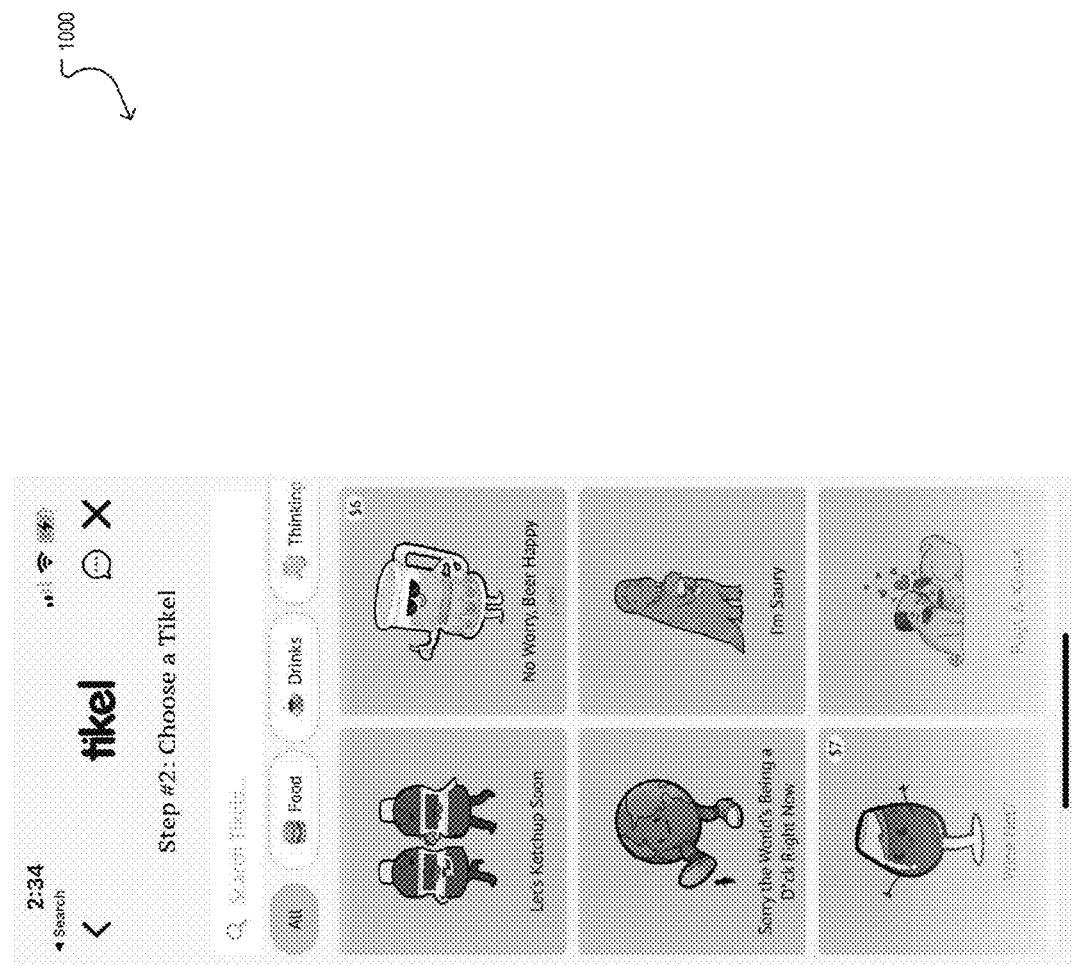

FIG. 10 shows a screenshot 1000 of an example GUI of the experiential locking and unlocking application 106 according to an example of the instant disclosure. As shown in FIG. 10, there are other example message templates 902 shown such as "Let's Ketchup Soon" and "No Worry, Beer Happy" among others. In addition, there are other example message template categories including "Food" and "Drinks" among others.

Figure 11:
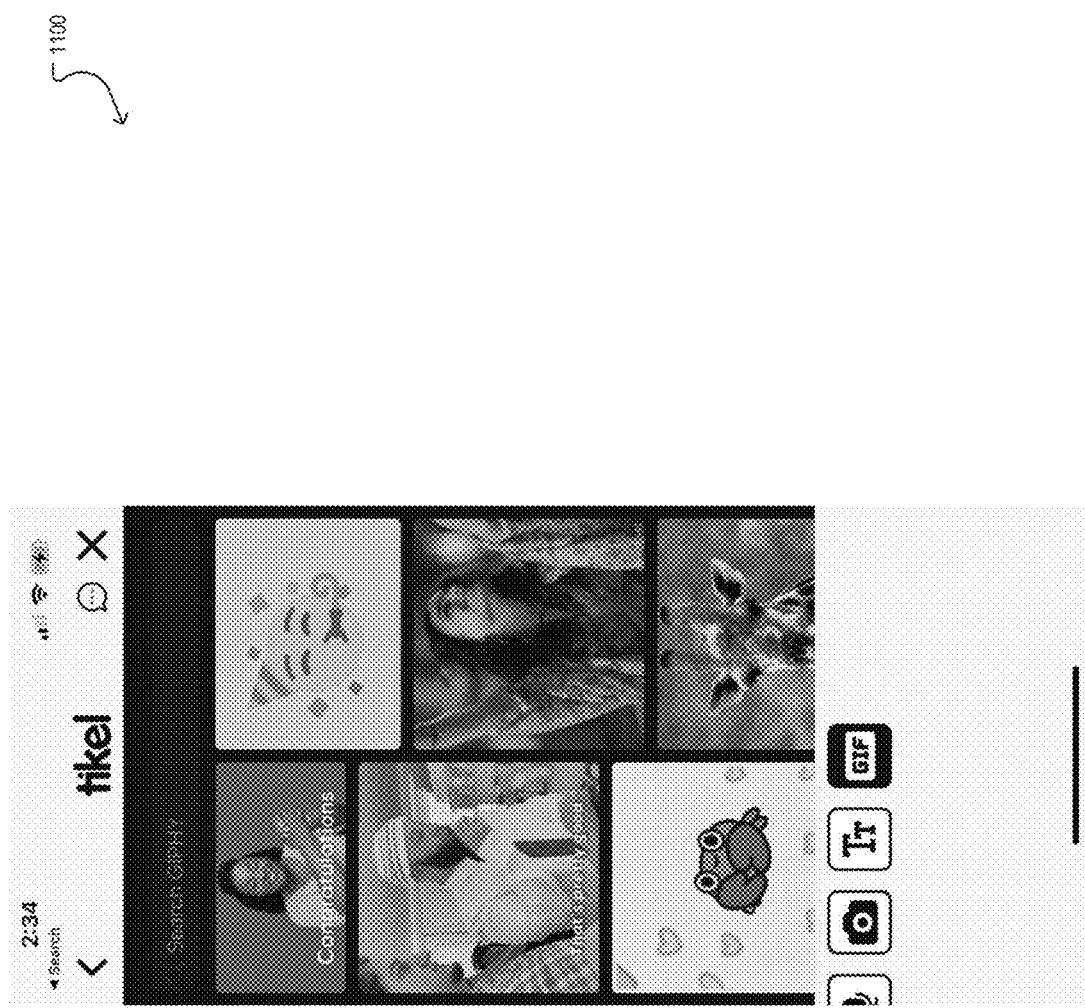

FIG. 11 shows a screenshot 1100 of an example GUI of the experiential locking and unlocking application 106 according to an example of the instant disclosure. As shown in FIG. 11, when creating a message 112 to be sent from a sending client computing device 102 to at least one recipient client computing device 102, the user may provide audio based input using a microphone of the client computing device 102, one or more images or videos using the one or more cameras of the client computing device 102, text, and one or more graphics interchange format files, e.g., GIFs. Example GIFs that can be added to the message are shown in FIG. 11.

Figure 12:
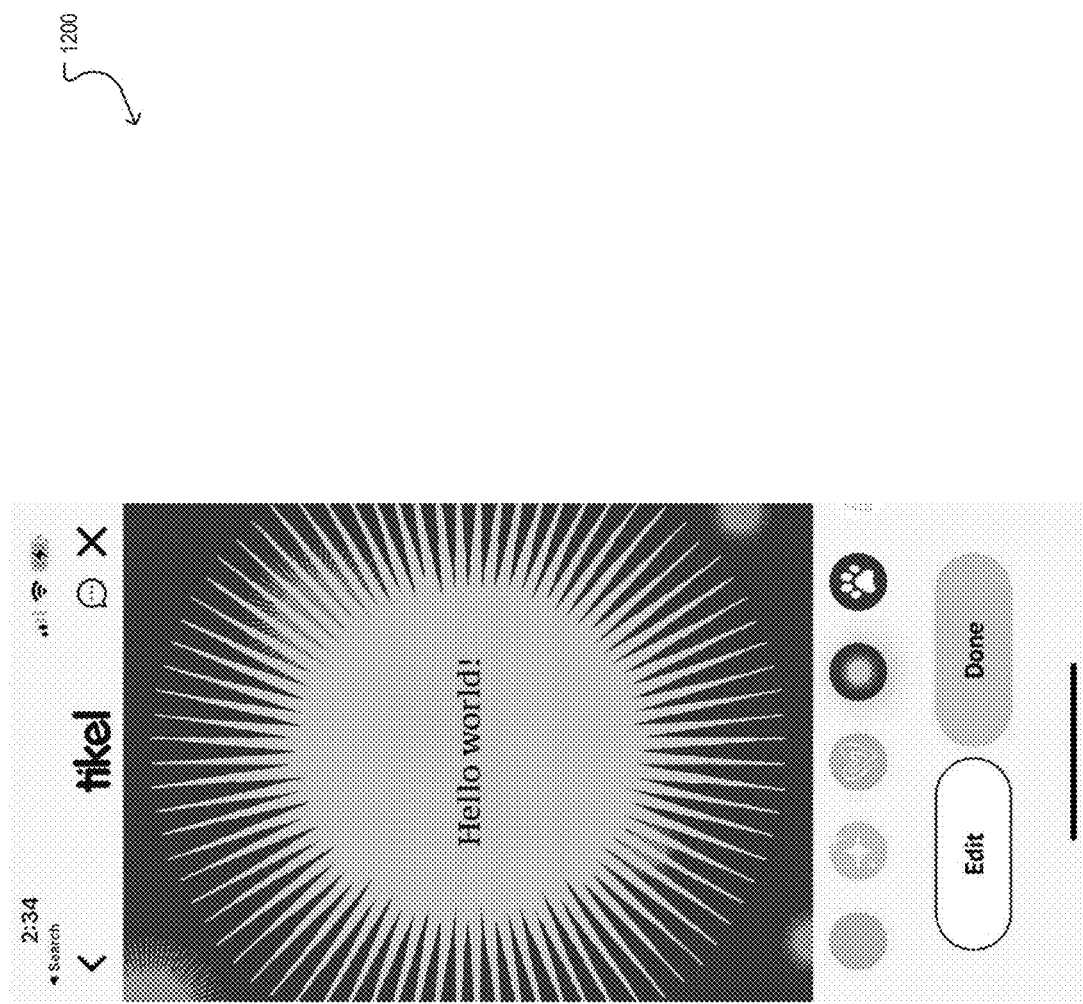

FIG. 12 shows a screenshot 1200 of an example GUI of the experiential locking and unlocking application 106 according to an example of the instant disclosure. As shown in FIG. 12, a user may create a message 112 by selecting from one or more backgrounds and providing text such as "Hello world!" A user may edit the message 112 by selecting an "Edit" GUI element and may be done editing the message by selecting a "Done" GUI element. After selecting the "Done" GUI element, the user of the sending client computing device 102 is asked to select at least one factor to lock, restrict, protect, or obscure at least a portion of the message 114. In one example, the user can select a smile lock, a time-based lock, and a location-based lock, among other factors that are used to lock at least the portion of the message 114. The message is then sent by the server computing device 104 to the recipient client computing device 102 and the user of the recipient client computing device 102 can unlock the message based on the one or more factors.

Figure 13:
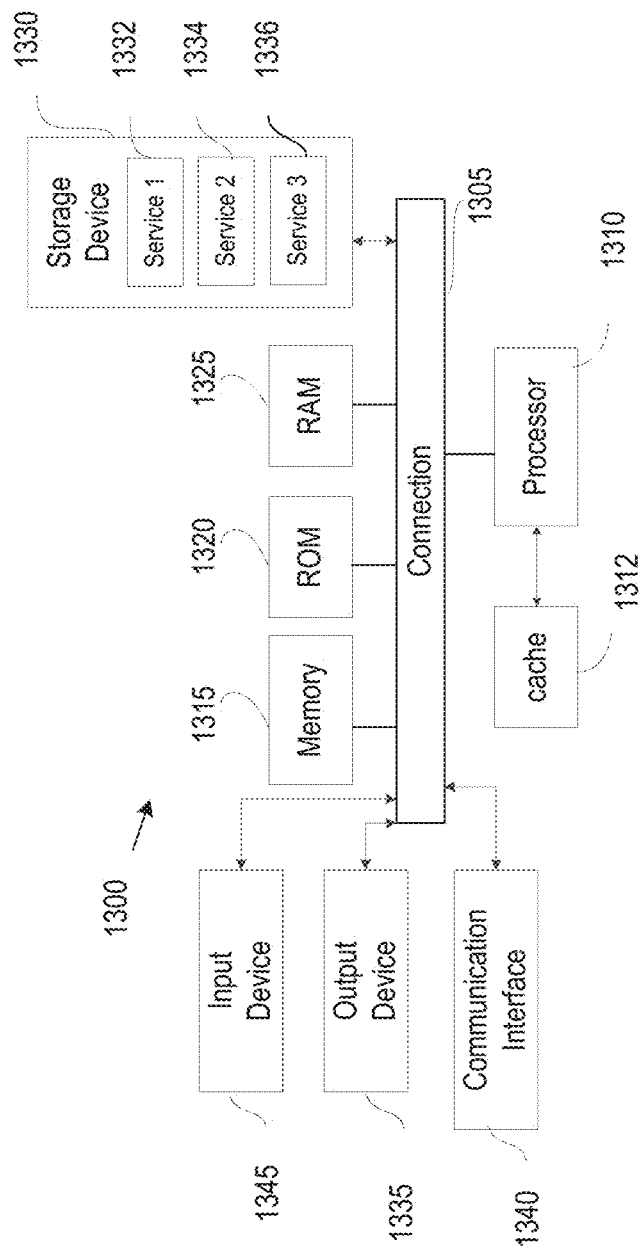
FIG. 13 shows an example of a system for implementing certain aspects of the present technology.

FIG. 13 shows an example of computing system 1300, which can be for example any computing device making up the computing device such as the plurality of client computing devices 102, the server computing device 104, or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache of high-speed memory 1312 connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement, and therefore the basic features here may easily be substituted for improved hardware or firmware arrangements as they are developed.

Storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method comprising: receiving, by at least one processor, a request to send a message to a recipient computing device, locking, by the at least one processor, the message to send to the recipient computing device using at least one factor of a number of factors, determining, by the at least one processor, a recipient associated with the recipient computing device and sending the message to the recipient computing device, determining, by one of the at least one processor and the recipient computing device, whether the message can be unlocked by the recipient computing device based on the number of factors, and unlocking, by one of the at least one processor and the recipient computing device, the message based on the number of factors.

Aspect 2: The method of Aspect 1, wherein the number of factors comprise at least one of a current time, a facial expression provided by the recipient and detected in realtime by an imaging device of the recipient computing device, a gesture provided by the recipient to a touchscreen of the recipient computing device, a doodle provided by the recipient to a touchscreen of the recipient computing device, a current location of the recipient computing device, a number of steps in a period of time determined by a fitness tracker in communication with the recipient computing device, and data from an internet of things (IOT) computing device sent to the recipient computing device.

Aspect 3: The method of any of Aspects 1 and 2, wherein the message comprises a monetary gift redeemable by the recipient when the message is unlocked based on the factors.

Aspect 4: The method of any of Aspects 1 to 3, wherein the message comprises at least one of text, at least one image, at least one video, at least one graphics interchange format (GIF), and at least one emoji.

Aspect 5: The method of any of Aspects 1 to 4, further comprising comparing a current time to a particular time to determine whether to unlock the message.

Aspect 6: The method of any of Aspects 1 to 5, further comprising comparing the facial expression provided by the recipient and determining whether the facial expression comprises a smile to determine whether to unlock the message.

Aspect 7: The method of any of Aspects 1 to 6, further comprising comparing the gesture provided to the touchscreen with a particular gesture to determine whether to unlock the message.

Aspect 8: The method of any of Aspects 1 to 7, further comprising comparing the current location with a particular location to determine whether to unlock the message.

Aspect 9: The method of any of Aspects 1 to 8, further comprising comparing the number of steps in the period of time with a threshold number of steps in the period of time to determine whether to unlock the message.

Aspect 10: The method of any of Aspects 1 to 9, wherein the data from the IOT computing device represents fuel consumption of a vehicle.

Aspect 11: The method of any of Aspects 1 to 10, further comprising comparing the fuel consumption of the vehicle with a threshold fuel consumption to determine whether to unlock the message.

Aspect 12: The method of any of Aspects 1 to 11, wherein the factors further comprise a challenge to be completed by a user of the recipient computing device.

Aspect 13: The method of any of Aspects 1 to 12, further comprising receiving a video representing a response to the challenge from the user of the recipient computing device, transmitting the video to a sending computing device for review by a user of the sending computing device.

Aspect 14: The method of any of Aspects 1 to 13, further comprising receiving an approval of the challenge by the sending computing device and unlocking the message.

Aspect 15: The method of any of Aspects 1 to 14, wherein at least a portion of the message is locked and the portion of the message can be unlocked based on the number of factors.

Aspect 16: A system comprising a memory storing computer-readable instructions; and at least one processor to execute the instructions to receive a request to send a message to a recipient computing device, lock the message to send to the recipient computing device using at least one factor of a number of factors, determine a recipient associated with the recipient computing device and send the message to the recipient computing device, determine, by one of the at least one processor and the recipient computing device, whether the message can be unlocked by the recipient computing device based on the number of factors, and unlock, by one of the at least one processor and the recipient computing device, the message based on the number of factors.

Aspect 17: The system of Aspect 16, wherein the number of factors comprise at least one of a current time, a facial expression provided by the recipient and detected in realtime by an imaging device of the recipient computing device, a gesture provided by the recipient to a touchscreen of the recipient computing device, a doodle provided by the recipient to a touchscreen of the recipient computing device, a current location of the recipient computing device, a number of steps in a period of time determined by a fitness tracker in communication with the recipient computing device, and data from an internet of things (IOT) computing device sent to the recipient computing device.

Aspect 18: The system of Aspects 16 and 17, wherein at least a portion of the message is locked and the portion of the message can be unlocked based on the number of factors.

Aspect 19: A non-transitory computer-readable storage medium comprising instructions stored thereon that, when executed by a mobile computing device cause the mobile computing device to perform operations, the operations including receiving a request to send a message to a recipient computing device, locking the message to send to the recipient computing device using at least one factor of a number of factors, determining a recipient associated with the recipient computing device and sending the message to the recipient computing device, determining, by one of the server computing device and the recipient computing device, whether the message can be unlocked by the recipient computing device based on the number of factors, and unlocking, by one of the server computing device and the recipient computing device, the message based on the number of factors.

Aspect 20: The non-transitory computer-readable storage medium of Aspect 19, wherein the number of factors comprise at least one of a current time, a facial expression provided by the recipient and detected in realtime by an imaging device of the recipient computing device, a gesture provided by the recipient to a touchscreen of the recipient computing device, a doodle provided by the recipient to a touchscreen of the recipient computing device, a current location of the recipient computing device, a number of steps in a period of time determined by a fitness tracker in communication with the recipient computing device, and data from an internet of things (IOT) computing device sent to the recipient computing device.

Aspect 21: The non-transitory computer-readable storage medium of Aspects 19 and 20, wherein at least a portion of the message is locked and the portion of the message can be unlocked based on the number of factors.

What is claimed is:

1. A method, comprising:
   receiving, by at least one processor, a request to send a message to a recipient computing device;
   locking, by the at least one processor, the message to send to the recipient computing device using at least one factor of a number of factors;
   determining, by the at least one processor, a recipient associated with the recipient computing device and sending the message to the recipient computing device;
   determining, by one of the at least one processor and the recipient computing device, whether the message can be unlocked by the recipient computing device based on the number of factors; and
   unlocking, by one of the at least one processor and the recipient computing device, the message based on the number of factors,
   wherein the number of factors comprises data from an internet of things (IoT) computing device sent to the recipient computing device, and wherein the data from the IoT computing device represents fuel consumption of a vehicle.

2. The method of claim 1, wherein the number of factors comprises at least one of a current time, a facial expression provided by the recipient and detected in realtime by an imaging device of the recipient computing device, a gesture provided by the recipient to a touchscreen of the recipient computing device, a doodle provided by the recipient to a touchscreen of the recipient computing device, a current location of the recipient computing device, and a number of steps in a period of time determined by a fitness tracker in communication with the recipient computing device.

3. The method of claim 2, wherein the message comprises a monetary gift redeemable by the recipient when the message is unlocked based on the factors.

4. The method of claim 2, wherein the message comprises at least one of text, at least one image, at least one video, at least one graphics interchange format (GIF), and at least one emoji.

5. The method of claim 2, further comprising comparing a current time to a particular time to determine whether to unlock the message.

6. The method of claim 2, further comprising comparing the facial expression provided by the recipient and determining whether the facial expression comprises a smile to determine whether to unlock the message.

7. The method of claim 2, further comprising comparing the gesture provided to the touchscreen with a particular gesture to determine whether to unlock the message.

8. The method of claim 2, further comprising comparing the current location with a particular location to determine whether to unlock the message.

9. The method of claim 2, further comprising comparing the number of steps in the period of time with a threshold number of steps in the period of time to determine whether to unlock the message.

10. The method of claim 1, further comprising comparing the fuel consumption of the vehicle with a threshold fuel consumption to determine whether to unlock the message.

11. The method of claim 2, wherein the factors further comprise a challenge to be completed by a user of the recipient computing device.

12. The method of claim 11, further comprising receiving a video representing a response to the challenge from the user of the recipient computing device, transmitting the video to a sending computing device for review by a user of the sending computing device.

13. The method of claim 12, further comprising receiving an approval of the challenge by the sending computing device and unlocking the message.

14. The method of claim 1, wherein at least a portion of the message is locked and the portion of the message can be unlocked based on the number of factors.

15. A system comprising:
 a memory storing computer-readable instructions; and
 at least one processor to execute the instructions to:
  receive a request to send a message to a recipient computing device;
  lock the message to send to the recipient computing device using at least one factor of a number of factors;
  determine a recipient associated with the recipient computing device and send the message to the recipient computing device;
  determine, by one of the at least one processor and the recipient computing device, whether the message can be unlocked by the recipient computing device based on the number of factors; and
  unlock, by one of the at least one processor and the recipient computing device, the message based on the number of factors,
 wherein the number of factors comprises data from an internet of things (IoT) computing device sent to the recipient computing device, and wherein the data from the IoT computing device represents fuel consumption of a vehicle.

16. The system of claim 15, wherein the number of factors comprises at least one of a current time, a facial expression provided by the recipient and detected in realtime by an imaging device of the recipient computing device, a gesture provided by the recipient to a touchscreen of the recipient computing device, a doodle provided by the recipient to a touchscreen of the recipient computing device, a current location of the recipient computing device, and a number of steps in a period of time determined by a fitness tracker in communication with the recipient computing device.

17. The system of claim 15, wherein at least a portion of the message is locked and the portion of the message can be unlocked based on the number of factors.

18. A non-transitory computer-readable storage medium comprising instructions stored thereon that, when executed by a server computing device cause the server computing device to perform operations, the operations comprising:
 receiving a request to send a message to a recipient computing device;
 locking the message to send to the recipient computing device using at least one factor of a number of factors;
 determining a recipient associated with the recipient computing device and sending the message to the recipient computing device;
 determining, by one of the server computing device and the recipient computing device, whether the message can be unlocked by the recipient computing device based on the number of factors; and
 unlocking, by one of the server computing device and the recipient computing device, the message based on the number of factors,
 wherein the number of factors comprises data from an internet of things (IoT) computing device sent to the recipient computing device, and wherein the data from the IoT computing device represents fuel consumption of a vehicle.

19. The non-transitory computer-readable storage medium of claim 18, wherein the number of factors comprises at least one of a current time, a facial expression provided by the recipient and detected in realtime by an imaging device of the recipient computing device, a gesture provided by the recipient to a touchscreen of the recipient computing device, a doodle provided by the recipient to a touchscreen of the recipient computing device, a current location of the recipient computing device, and a number of steps in a period of time determined by a fitness tracker in communication with the recipient computing device.

20. The non-transitory computer-readable storage medium of claim 18, wherein at least a portion of the message is locked and the portion of the message can be unlocked based on the number of factors.

* * * * *